May 18, 1926.

T. H. WILLIAMS 1,585,274

RIMMING PRESS

Filed May 23, 1925    3 Sheets-Sheet 1

Inventor
T. H. Williams.

Attorneys

Inventor
T.H Williams

Patented May 18, 1926.

1,585,274

UNITED STATES PATENT OFFICE.

THOMAS HENRY WILLIAMS, OF AKRON, OHIO, ASSIGNOR TO THE ADAMSON MACHINE COMPANY, OF AKRON, OHIO, A CORPORATION OF OHIO.

RIMMING PRESS.

Application filed May 23, 1925. Serial No. 32,349.

The invention relates to a press for temporarily clamping together the rim rings used in the manufacture of cord tires, for entering and tightening the clamping bolts or loosening and removing the same; and the present construction is an improvement over my prior patent upon rimming presses, Number 1,466,079, issued to me August 28, 1923.

The object of the improvement is to provide a supporting table having a movable central portion arranged to support the rim rings and raise the tire clear of the table; and to provide disappearing clamping arms which act upon movable pivots.

When a cord tire is built upon an ordinary core and transferred to a resilient core, commonly called an air bag, the beads of the tire stand slightly apart and must be clamped together before the air bag can be fully inflated and the tire placed in a mold for the vulcanizing process.

In my prior patent above referred to, I provide a supporting table operated by an elevator stem, and swinging arms, movable upon fixed pivots and adapted to operate upward and outward to engage rim rings upon the table, when the table is raised, and dropping inward and downward below the table when the same is lowered.

While this construction is suitable for tires up to a certain size, difficulty has been experienced in the operation of such a rimming press for clamping the rim rings of tires of large cross sectional area, such as "balloon" tires and heavy truck tires, arising from the fact that the swinging arms must be limited in length, owing to their mode of operation, making it difficult or impossible for them to engage the rim rings of the tire to properly clamp the same together.

It has also been found, especially in tires of large cross sectional area, that, owing to the fact that the tire rests upon the cross head table during the clamping operation, the side walls of the tire are flattened at these points, disturbing the formation of the cord fabric and weakening the walls of the tire.

The present improvement is especially designed to permit the rim rings of "balloon" tires and heavy truck tires to be clamped thereon without the objectionable features above mentioned; and the improvement involves the use of swinging arms having sliding pivots and the provision of a table having a central portion only which raises, thus adapting the press to tires of large cross sectional area and providing for raising the tire entirely clear of the table during the clamping operation.

The improvement may take the form of the press illustrated in the accompanying drawings, in which:—

Figure 1:
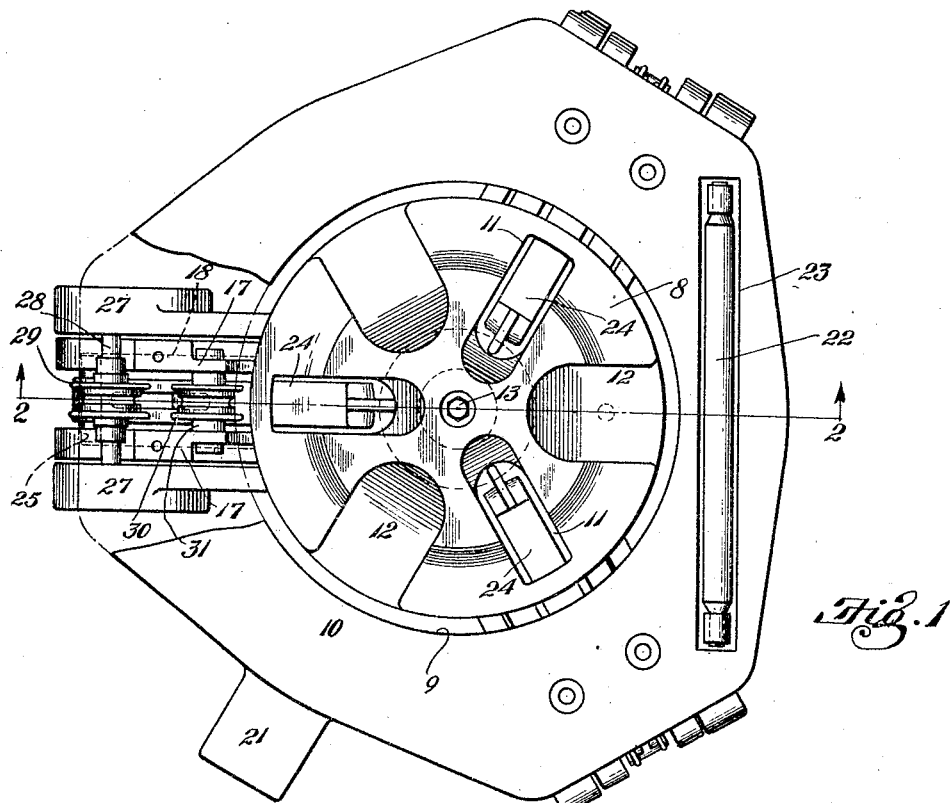
Figure 2:
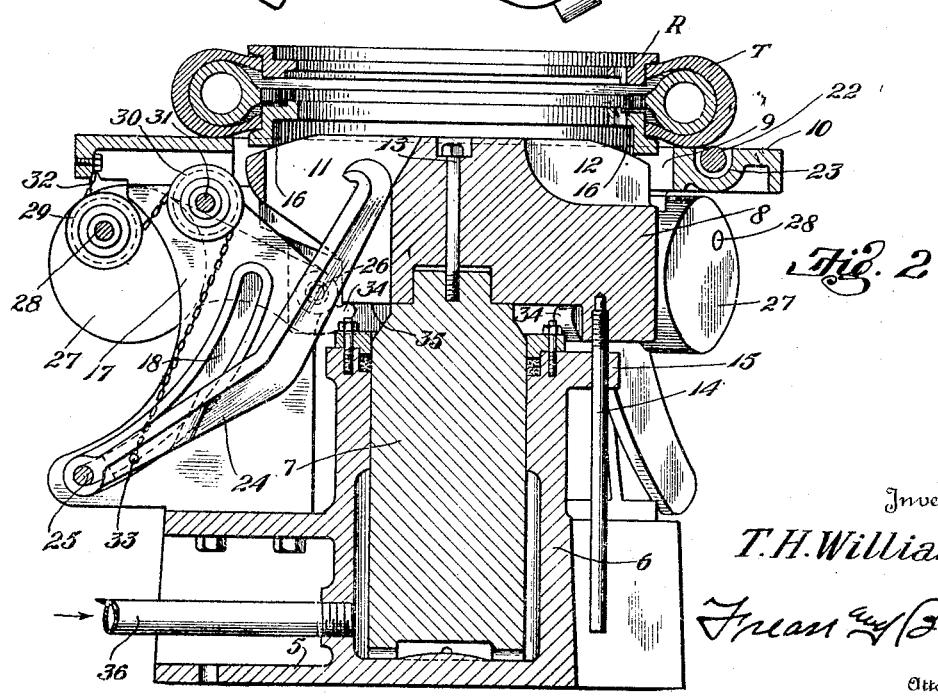
Figure 3:
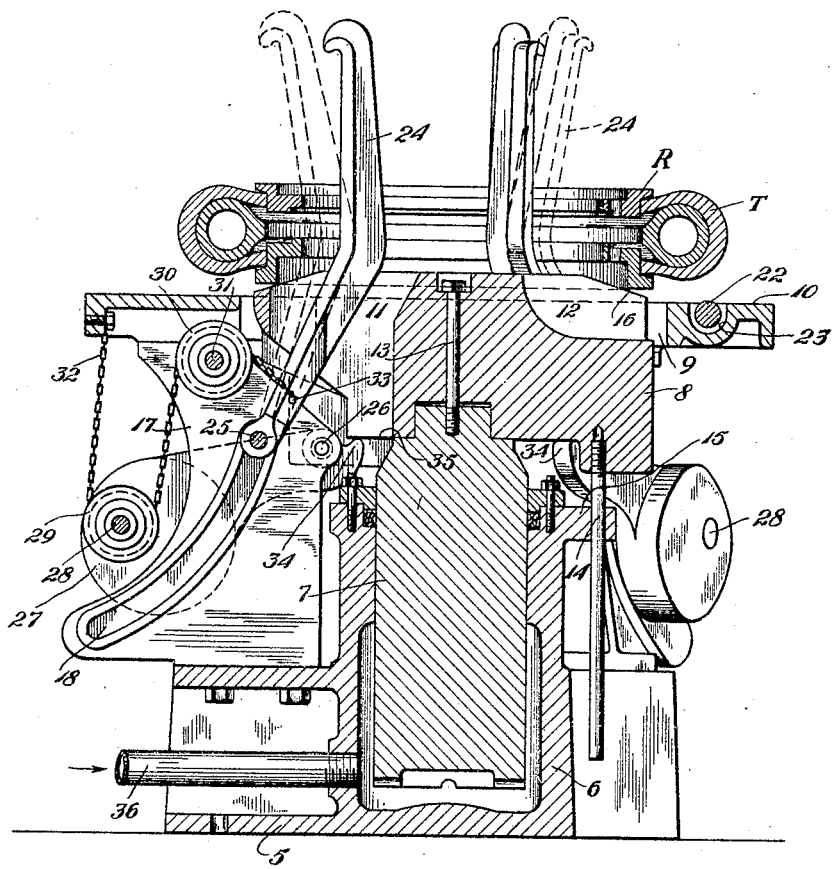
Figure 4:
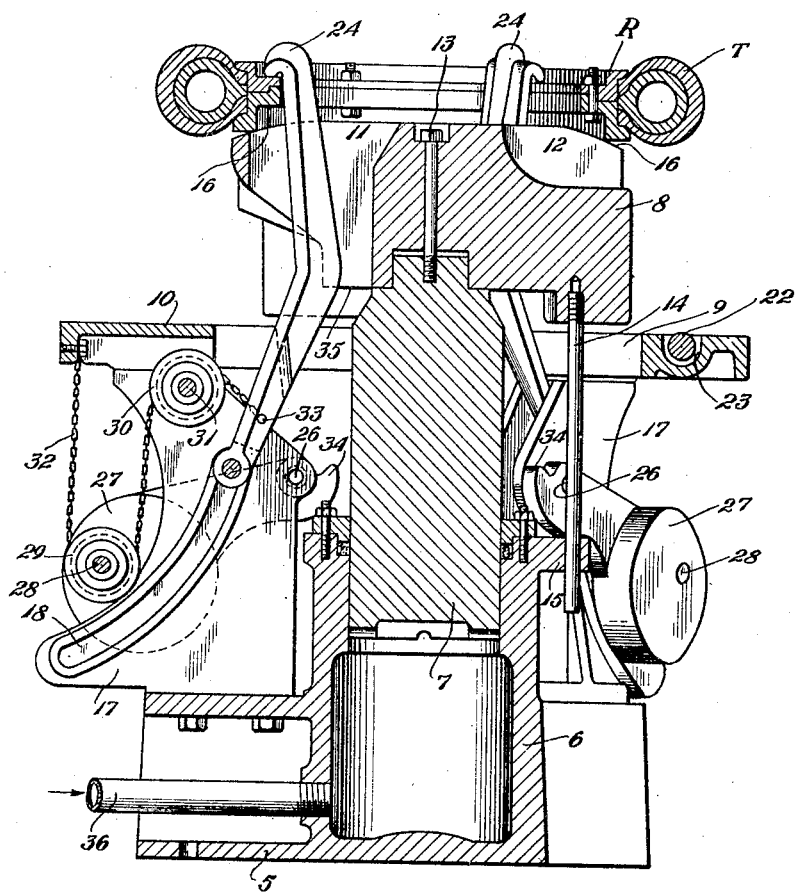

Figure 1 is a plan view of the improved press, showing the parts in the normal or lowered position, a portion of the stationary table being broken away to show a full plan of one swinging arm;

Fig. 2, a vertical section of the press on the line 2—2, Fig. 1;

Fig. 3, a similar view showing the central movable portion of the table raised sufficiently to permit the movable pivots of the swinging clamping arms to raise to their extreme height; and Fig. 4, a similar sectional view of the press, with the movable center of the table in raised or operative position, showing a tire and rim rings thereon clamped by the swinging arms.

Similar numerals refer to similar parts throughout the drawings.

The press includes a base 5, having an upright cylinder 6 therein, in which operates as a piston the elevator stem 7, of the movable table 8, which may be in the form of a circular head located within the central opening 9 of the stationary table 10, and provided with the radial passage 11 and radial depressions 12, in its top surface.

The movable table or head 8 may be connected to the piston 7 as by the bolt 13 and is provided with a depending guide rod 14 slidably located through a lug 15 upon one side of the cylinder to prevent axial turning of the piston and head. The upper peripheral edge of the movable table or head is beveled as shown at 16.

A plurality of brackets corresponding to the radial passages 11 in the movable table, are fixedly mounted upon the upright cylinder, each bracket being in the form of a pair of parallel upright guide plates 17 provided with the arcuate guide slots or grooves 18 and the stationary table 10 is fixed upon the upper ends of these brackets and surrounds the movable table or head 8, having the central opening 9 to receive said movable table.

A projection or stud 21 may be provided upon one side of the stationary table for supporting the clamping rings during the operation of soaping the same before they are placed upon the tire and a roller 22 may be placed in a slot 23 at one side of the table to permit the tire, with the clamping rings thereon to be dragged across the table and placed in position thereon.

Between each set of guide plates is slidably mounted an inwardly and upwardly extending swinging arm 24, the lower outer end of which is provided with studs 25 extended into the guide grooves 18 of the plates and slidably mounted therein.

Pivotally mounted upon the outer side of each guide plate 17, as indicated at 26, is a counterweight 27, each pair of counterweights being connected together near their outer ends by a shaft 28 upon which is mounted a pulley or sheave 29 and a similar pulley 30 is mounted upon a shaft 31 connected to the upper ends of each pair of guide plates.

A chain or cable 32 is connected to the underside of the stationary table 10, adjacent to each pair of guide plates and extends downward around the pulley 29 upward around the pulley 30 and then downward to a point spaced from the lower end of the corresponding swinging arm 24, being connected thereto, as shown at 33.

Each counterweight is provided at its inner end with a cam finger 34 extending inward from its pivotal bearing 26 under an abutment 35 on the underside of the movable table or head 8.

The parts are so proportioned and arranged that when the movable table 8 is lowered into normal position as shown in Figs. 1 and 2, the abutments 35 will impinge the fingers 34 and carry them downward, raising the counterweights 27 upward into normal inoperative position, as best shown in Fig. 2, thereby permitting the hooked swinging arms 24 to slide downward by their own weight until the studs 25 thereof engage the lower ends of the guide slots 18, bringing the arms into the inoperative position with their hooked ends below the top of the table, as shown in the same figure.

The table may be raised or operated upward by means of compressed air, water or oil received through a supply pipe 36, which may be controlled by suitable valves; and during an initial upward movement of the movable upper table, as shown in Figure 3, the rising of the abutments 35 elevates them with reference to the fingers 34 and permits the counterweights to swing downward which causes the hooked arms to slide upward until the studs 25 thereon engage the upper ends of the guide slots 18, as shown in Figure 3.

It should be understood that before operating the table a tire T with rim flanges R has been placed in position thereon as illustrated in Fig. 2. A further upward movement of the piston and movable table entirely releases the abutments 35 from the fingers 34 permitting the counterweights to drop to their lowest position as shown in Fig. 4, swinging the arms 24 outward upon their pivots engaging the rim rings before the rings engage the hooks thereof after which the rings are clamped together by a further raising of the table with the hooked arms in engagement with the rings.

It will be seen that the rings are centered upon the beveled edge 16 of the movable table, the clamping action being between said beveled edge of the table and the hooked ends of the arms, the tire being raised clear of the stationary table during the clamping action thus preventing any damage to the side walls of the tire.

It will also be seen that the swinging arms being mounted upon movable pivots permit the arms to be extended a sufficient distance above the table to permit the clamping of the rim rings upon "balloon" tires, heavy truck tires or other tires having a large cross sectional area.

The flexible chain connections of the hooks with their counterweights, permit the hooks to operate independently of each other and causes each hook to swing into engagement with the rim rings even though the same may not be exactly centrally positioned upon the table; and it will be seen that as the table is lowered until the abutments 35 engage the fingers 34 and raise the counterweights the hooked arms will automatically slide downward by their own weight in the guide grooves 18 and disappear below the top of the table, permitting the tire with the rim rings secured thereto to be easily removed from the table.

I claim:—

1. A press for tire rim rings and the like including a table, means for elevating the table and swinging arms having sliding pivots for normally dropping below the table when the same is lowered and operable upward for engaging and clamping rings on the table when the same is elevated.

2. A press for tire rim rings and the like including a table having openings therein, means for elevating the table and rim engaging arms mounted upon sliding pivots and normally dropping below the table when the same is lowered and operable through the openings for engaging and clamping rings on the table when the same is elevated.

3. A press for tire rim rings and the like, including a table, means for elevating the table, rim engaging arms mounted upon slidable pivots and operable above and below the table, and yielding means rendered inoperative by a lowering of the table for swinging the arms upward to engage and clamp rings on the table when the same is elevated.

4. A press for tire rim rings and the like including a table, means for elevating the table, rim engaging arms having slidable pivots and operable above and below the table and independent yielding means rendered inoperative by a lowering of the table for swinging the arms upward to engage and clamp rings on the table when the same is elevated.

5. A press for rim rings and the like including a table, means for elevating the table, rim engaging arms having sliding pivots and operable above and below the table and yielding means sliding and swinging the arms upward to engage and clamp rings on the table and means actuated by the lowering of the table for rendering the yielding means inoperative.

6. A press for tire rim rings and the like including a table, means for elevating the table, rim engaging arms having sliding pivots and normally dropping by their weight, below the table, counterweights sliding and swinging the arms upward to engage and clamp rings on the table when the same is elevated, the arms being relieved of the action of the weights by the lowering of the table.

7. A press for tire rim rings and the like including a stationary table, a movable table, means for elevating the movable table, movable arms normally dropping below the movable table when the same is lowered and operable upward for engaging and clamping rings on the movable table when the same is elevated.

8. A press for tire rim rings and the like including a table having a beveled upper edge to engage the rim rings only of the tire, means for elevating the table, and movable arms for engaging and clamping the rings on the table when the same is elevated, whereby the tire is supported out of contact with the table during the clamping operation.

In testimony that I claim the above, I have hereunto subscribed my name.

THOMAS HENRY WILLIAMS.